(12) United States Patent
Drubel et al.

(10) Patent No.: US 7,174,075 B2
(45) Date of Patent: Feb. 6, 2007

(54) INTEGRATED ARRANGEMENT OF OPTICAL FIBERS IN A CONDUCTOR

(75) Inventors: Oliver Drubel, Nussbaumen (CH); Alberto Izquierdo, Neuenhof (CH); Gunter Scherf, Birr (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/883,793

(22) Filed: Jul. 6, 2004

(65) Prior Publication Data

US 2005/0082084 A1    Apr. 21, 2005

(30) Foreign Application Priority Data

Jul. 11, 2003   (DE) ................... 103 31 486

(51) Int. Cl.
  *G02B 6/44*    (2006.01)
  *H02G 3/00*    (2006.01)

(52) U.S. Cl. .................. 385/101; 174/70 R
(58) Field of Classification Search ............... 385/101; 174/70 R See application file for complete search history.

(56) References Cited

U.S. PATENT DOCUMENTS

| | | | | |
|---|---|---|---|---|
| 4,359,598 A | * | 11/1982 | Dey et al. ............... | 174/40 R |
| 4,699,461 A | * | 10/1987 | Taylor et al. ............ | 385/110 |
| 4,895,426 A | * | 1/1990 | Pinson .................... | 385/101 |
| 5,300,844 A | * | 4/1994 | Schuler .................. | 310/215 |
| 5,668,912 A | * | 9/1997 | Keller ..................... | 385/100 |
| 5,760,516 A | * | 6/1998 | Baumann et al. ........ | 310/201 |
| 6,721,470 B2 | * | 4/2004 | Bosselmann et al. ..... | 385/12 |
| 6,738,547 B2 | * | 5/2004 | Spooner ................. | 385/101 |
| 2002/0196994 A1 | | 12/2002 | Bosselmann et al. | |
| 2003/0081917 A1 | * | 5/2003 | Bussear .................. | 385/101 |

FOREIGN PATENT DOCUMENTS

| | | |
|---|---|---|
| DE | 38 17 280 A1 | 11/1989 |
| DE | 35 18 909 C2 | 1/1993 |
| DE | 44 06 577 A1 | 8/1995 |
| DE | 195 07 941 | 9/1995 |
| DE | 195 07 941 A1 | 9/1995 |
| DE | 43 04 545 C2 | 10/1998 |
| DE | 199 62 668 C1 | 12/2000 |
| DE | 199 35 440 A1 | 2/2001 |
| DE | 101 39 760 A1 | 2/2002 |
| DE | 101 39 096 A1 | 6/2002 |

(Continued)

OTHER PUBLICATIONS

Search Report from DE 103 31 486.5 (Jan. 13, 2004).

*Primary Examiner*—John D. Lee
*Assistant Examiner*—Rhonda S. Peace
(74) *Attorney, Agent, or Firm*—Cermak & Kenealy, LLP; Adam J. Cermak

(57) ABSTRACT

An electrical conductor and in particular a conductor bar of an electrical machine, particularly a generator or transformer, in which an optical measuring device can be integrally arranged. A measuring unit includes an electrical conductor and an optical measuring device arranged in the conductor, and a production method for producing such an electrical conductor is described. The electrical conductor (10), having a conductor cross section and also an extent in the conductor longitudinal direction, includes a recess (11, 12, 13) in the conductor longitudinal direction at least along a section of the conductor, for integrated arrangement of a signal conductor, in particular an optical waveguide.

30 Claims, 3 Drawing Sheets

FOREIGN PATENT DOCUMENTS

| | | |
|---|---|---|
| DE | 101 43 222 C1 | 4/2003 |
| EP | 0 342 468 | 11/1989 |
| FR | 2 513 432 | 3/1983 |
| FR | 2 687 830 | 8/1993 |
| JP | 61-164444 | 7/1986 |
| JP | 5-64396 | 3/1993 |
| JP | 6-275144 | 9/1994 |
| JP | 2000-299967 | 10/2000 |
| WO | 00/57540 | 9/2000 |

* cited by examiner

INTEGRATED ARRANGEMENT OF OPTICAL FIBERS IN A CONDUCTOR

This application claims priority under 35 U.S.C. § 119 to German application number 103 31 486.5, filed 11 Jul. 2003, the entirety of which is incorporated by reference herein.

BACKGROUND

1. Field of the Invention

The invention relates to an electrical conductor and particularly a conductor bar, or a partial conductor of a conductor bar, which can in particular be used in a generator or transformer, and into which conductor bar, or the partial conductor of a conductor bar, an optical measuring device can be integrated. Furthermore the invention relates to an optical measuring unit including an electrical conductor and an optical measuring device arranged in the conductor, and also to a method of producing such an electrical conductor.

2. Brief Description of the Related Art

In electrical generators, transformers, and also other electrical machines, conductors, so-called conductor bars (bars for short) are used for conducting the electrical current, in individual arrangement or as bar packets. These conductors are heated up rather considerably due to the current flux. If the temperature exceeds a certain maximum value, damage to the electrical conductor itself or also to other components adjacent to the conductor can occur. As far as desirable, a constant monitoring of the temperature is to be performed. In a few electrical machines known from the prior art, in particular in those which represent a large investment cost, and which are thus designed for a long lifetime, such temperature monitoring is already realized. For this purpose, a suitable sensor is placed at a place to be measured. The sensor then generates a measurement signal which is to be supplied for further processing via a signal lead from the sensor. In electrical machines, due to the often very high current fluxes and the strong electromagnetic fields built up as a consequence of these high current fluxes, conduction of an electrical signal is not reasonably possible. Moreover metallic sensors cannot be used at mass locations which lie at a high electrical potential. In order to prevent signal errors due to signal scattering, sensors which produce optical signals are therefore mostly used at the present time in electrical machines, the signals then being supplied for further processing via optical signal conductors, in particular optical waveguides. Moreover the electrical generators and transformers are at present embodied in a very compact construction, so that in particular the arrangement of the signal conductor raises constructional problems.

From German Offenlegungschrift DE 101 39 760 A1 there is for example known for this purpose a coil arrangement in which an optical waveguide used as a signal conductor is wound in with a winding body. The optical waveguide is in fact integrated into the winding body such that the external measurements of the winding body are thereby unchanged. However the production of the winding with the wound-in optical waveguide is an expensive manufacturing technology. In particular, a defective optical waveguide cannot easily be removed again and replaced with a new optical waveguide, without having to completely unwind the winding body.

There is also known from German Patentschrift DE 199 62 668 C1 an arrangement of an optical measuring device on a conductor. The conductor can for example be a stator or rotor winding of a generator. The conductor is pressed for this purpose into a groove of a bundle of stator laminations or rotor laminations, the groove being bounded by two groove sidewalls. The measuring device, which includes an optical sensor and an optical waveguide, is arranged on the long side of the groove remote from one of the two groove sidewalls. Thus if a sensor is arranged on a conductor according to this teaching, the constructional volume of the whole arrangement is increased at least corresponding to the dimensions of the optical waveguide and of the sensor. Furthermore, a quantity to be measured, for example temperature, can be determined only on the long side, i.e., above or below the conductor.

In all the known arrangements of the prior art, the sensors are respectively positioned on the outside of the electrical conductor. Thus hereby also only the temperatures abutting on the outsides are measurable.

SUMMARY OF THE INVENTION

One of the numerous aspects of present invention is to make available an electrical conductor, particularly a bar suitable for use in a generator or transformer, into which with comparatively low manufacturing cost an optical measuring device can be integrated. In particular, a freely selectable arrangement is to be possible of the optical measuring device at different positions of the conductor, so that the quantities to be measured can be correspondingly determined at these different positions of the conductor. Also, the dimensions of the electrical conductor are in particular not to be changed by the arrangement of the optical measuring device in proportion to a conductor without optical measuring device, so that it is possible to exchange a conductor without optical measuring device with a conductor with an optical measuring device.

One exemplary embodiment of the present invention provides that in an electrical conductor which has a conductor cross section and also an extent in the conductor longitudinal direction, forming in the conductor longitudinal direction, at least along a section of the conductor, a recess for integrated arrangement of a signal conductor, in particular an optical waveguide. The conductor is preferably a bar for use in an electrical machine, particularly in a generator or a transformer, or else is a partial conductor of a bar, particularly a Roebel bar, for use in an electrical machine, particularly in a generator or transformer.

In addition to the signal conductor, a sensor is also appropriately arranged in the recess, which detects a quantity to be measured, for example a temperature, converts it into a preferably optical signal, and passes it on the signal conductor. The signal conductor can also be constituted so that it itself has sensor functions or the sensor is a component of the signal conductor.

By the integrated arrangement of the signal conductor in a recess of the conductor, the conductor formed according to the invention remains unchanged in its external dimensions. Thus a very compact arrangement of the bar embodied according to the invention can be attained in an electrical machine, or else of plural partial conductors connected together into a bar. In particular, in an application, a conductor embodied according to the invention can be provided in the place of a conductor which is not equipped with an integrated arranged light optical waveguide, without further adapting measures being necessary for this purpose. The recesses to be provided in the conductor can easily be produced by various manufacturing techniques.

The recess preferably extends from an outer side of the conductor as far as the middle of the conductor, so that an optical waveguide can be supplied from this outer side of the conductor to the middle. In particular with symmetrically constructed conductors in which the symmetry axis runs through the middle of the conductor, it is sufficient to provide a recess extending as far as the center of the conductor.

The recess may however be provided as a through recess, i.e., passing from one outer side to the opposite outer side.

In a preferred embodiment of the invention, the recess is embodied as a slot-shaped groove. Such a groove can easily be produced by manufacturing technology, for example by means of a milling process. The groove is to be made with an only slightly greater width than the width of the optical waveguide. The depth of the groove can be chosen with complete freedom. In many cases of application, and particularly in those regions of the conductor which only the optical waveguide is passed through, it is sufficient to make the groove with a depth which is slightly greater than the dimension of the optical waveguide to be laid therein. If however the sensor is also to be arranged in the groove or if the optical waveguide also fulfills the function of a sensor at least in a section, it can be appropriate to make the groove with a greater groove depth, at least in the region where the sensor is to be arranged or in the region where the optical waveguide also functions as a sensor. Thus a determination of the measurement value, for example the measurement of the conductor temperature, is possible not only at the surface of the conductor but also within the conductor.

Alternatively or in addition, the recess can also be formed as a hole, preferably a borehole, in the conductor. A borehole is easy to produce and can be made as a blind hole or a through hole.

Alternatively, the recess can also be formed as a separation of the electrical conductor. For this purpose, for example, a preferably rectangular piece of the electrical conductor is separated at one side surface. The separation is to have a width which is only slightly greater than the width of the optical waveguide to be inserted in the groove.

The conductor can be made as a simple conductor path which can be arranged as an individual component in an electrical machine.

In a preferred embodiment of the invention, the electrical conductor is made as a bar, preferably as a wound bar and particularly preferably as a Roebel bar. A wound bar or a Roebel bar includes numerous partial conductors. The basic structure of such bars is known from, e.g., DE 101 39 760 A1 or else DE 199 62 668 C1. Here the recess usually runs along a bar or along the partial conductor or else integrated into a partial conductor.

In a conductor made as a Roebel bar, the partial conductors are arranged transposed, i.e., each partial conductor of the Roebel bar assumes each partial place of the cross section of the Roebel bar at least once. In a conductor formed as a Roebel bar, the recess is appropriately arranged so that this crosses the individual partial conductors. This is for example the case when the recess runs in a straight line, while the partial conductors of the Roebel bar are arranged transposed.

If the bar includes numerous partial conductors, alternatively to the embodiments described above, the recess can also preferably be made as a partial conductor gap. The partial conductor gaps are appropriately produced by removing a partial conductor from the bar. The optical waveguide can be integrated into the bar in place of the partial conductor.

The conductor according to the principles of the present invention includes with particular advantage numerous recesses which are arranged at different positions of the conductor. Particularly advantageously, the recesses are to be arranged so that they come to lie at different radial positions of a rotor or stator as soon as the conductor is arranged in a rotor or stator, for example of a generator.

In a further aspect, the invention makes available a measurement unit which includes an electrical conductor as described above, and also an optical waveguide which is arranged in the recess of the electrical conductor, for example of the bar. The optical waveguide acts here to conduct an optical signal which is generated, for example, by a sensor arranged at one end of the optical waveguide.

The measuring unit appropriately furthermore includes a sensor, particularly a temperature sensor or a strain measuring sensor, which is arranged such that signals generated by the sensor are conducted into the optical waveguide. It is thus possible to measure with the measuring unit, temperatures or stress loadings or other measurement quantities within the conductor, and to conduct the measurement signal outside over the optical waveguide for further processing. Continuous monitoring of temperature or loading of the conductor is thus possible. If the measurement value exceeds a given threshold value, so that damage to the conductor or to other, adjacent components is to be feared, a specific countermeasure, for example a reduction of the current passed through, can be introduced. Also, the sensor can be integrated into the optical waveguide, or plural sensors can also be integrated into the optical waveguide at different positions along the optical waveguide. A remaining gap space, remaining after arranging the optical waveguide and the sensor in the recess, is appropriately filled with a filler and cemented.

The exemplary embodiment of the measuring unit according to the invention here advantageously makes it possible that measurement values are determined by means of one or more sensors at one or more positions of the conductor, for example of the bar, and the sensor signals can be conducted out of the conductor for further processing. Furthermore, no additional space is required for the integration of the measuring unit, so that a conventional conductor can be replaced with the measuring unit according to the invention without changes having to be made in the reception and/or retaining device of the conductor.

The optical waveguide is advantageously arranged so that it simultaneously confers an insulation of partial conductors from one another and/or an insulation of the bar. For this, the optical waveguide is advantageously laid such that one or more partial conductors are, or the whole bar is, surrounded by a frame of the optical waveguide. Mutual insulation of the partial conductors prevents or at least reduces the danger of a voltage strike-through from one partial conductor to another. This is correspondingly valid for framing around the whole bar.

The signal conductor, for example an optical waveguide, is advantageously completely integrated into a small tube. The tube can be made of steel ('stainless steel') here. It is thus ensured that the signal conductor makes no direct contact with the insulating resin, thereby preventing mechanical stresses being developed in the signal conductor due to direct contact with the resin and consequent falsification of the signal.

In a further aspect, the invention makes available a production process for the production of an electrical conductor, particularly a conductor as above-described, and includes the following steps:

winding numerous partial conductors to form a bar, with the insertion of adhesive;

insertion of a recess running in the longitudinal direction of the bar, particularly by milling.

BRIEF DESCRIPTION OF THE DRAWINGS

The invention is described in detail hereinafter using embodiment examples in conjunction with the accompanying drawings.

In the Figures, only the elements and components necessary for understanding the invention are shown. Like components, and those acting in a like manner, are given the same reference numerals.

DETAILED DESCRIPTION OF THE PREFERRED EMBODIMENTS

Figure 1:
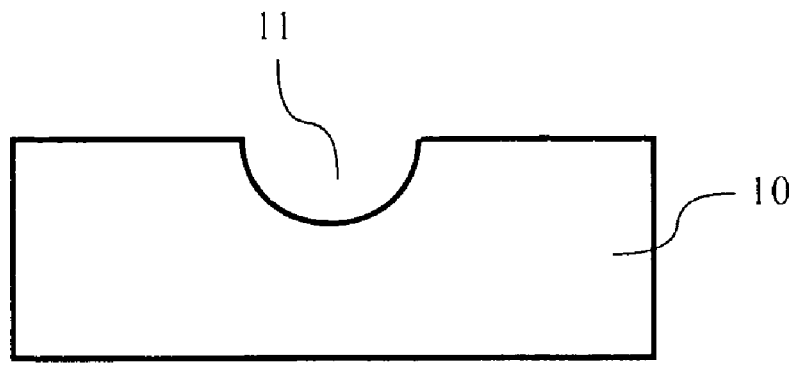
FIG. 1 schematically shows a cross section through an electrical conductor, embodied according to the invention, FIG. 2 schematically shows a cross section through a further electrical conductor, embodied according to the invention

FIG. 1 is a schematic diagram of a cross section through an electrical conductor 10 embodied according to the principles of the present invention. The conductor shown here is suitable for use in an electrical machine, particularly in a generator or a transformer. The conductor 10 has a substantially rectangular cross section. The extension of the conductor perpendicularly of the plane of the drawing forms the longitudinal direction of the conductor. In order to be able to arrange an optical waveguide integrated into the conductor, the conductor 10 shown in FIG. 1 has on its upper side a slot-shaped groove 11. The groove floor of the groove 11 is made half-round here. It cannot be seen in the diagram here that the slot-shaped groove 11 extends in the longitudinal direction of the groove 11 from one transverse side of the conductor to at least in the middle of the conductor.

An optical waveguide or another signal conductor can be laid in the slot-shaped groove 11. The sensor, for example a temperature sensor, is preferably arranged at the end of the optical waveguide ending in the conductor, so that signals of the sensor are introduced into the optical waveguide and transmitted in this.

The optical waveguide is pushed into the groove 11 as far as the groove floor, and the remaining gap space is filled with filler material flush with the upper side of the length of conductor. The filling material hardens here after a certain time.

A conductor 10 as shown in FIG. 1 can be used alone or in a grouping with further conductors or partial conductors as a generator bar or transformer bar. By the arrangement of the recess according to the invention, both a sensor and also a signal conductor can be integrated into the conductor, in order thus to measure a state quantity in the conductor, and also to conduct the measured state quantity as a signal to a processing unit located outside.

In comparison with the solutions known from the prior art, because of the integrated arrangement of an optical waveguide, no change occurs in the external dimensions of the conductor shown in FIG. 1. Accordingly the receiving recess of a rotor conductor packet or in a stator conductor packet in a generator or transformer does not have to be constructionally changed in order to arrange a conductor embodied according to the invention in the rotor conductor packet or stator conductor packet instead of the conventional conductor. Also, the constructional dimensions of the rotor or stator of the generator or transformer do not have to be changed when a conductor or partial conductor as in FIG. 1 is built in.

The groove can be formed with only a small depth or else with a greater depth. The groove depth can also vary sectionally. Accordingly the sensor or the optical waveguide can be arranged at different depths of the conductor. Thus measurement values can be determined and inspected by measurement technology, not only at the outside of the conductor, but also within the conductor. Likewise it is also possible to arrange plural grooves close to one another, so that measurement values can be determined at different adjacent positions.

A further advantage of the embodiment of the invention according to FIG. 1 includes that the recess is easy to produce by manufacturing techniques. A groove 11 as shown in FIG. 1 can for example be produced by a milling process. A hole-shaped recess which can be provided instead of a groove can also be produced by drilling. This is also the case for a wound bar, in which the recess either runs exclusively in one partial conductor or, particularly in the case of a Roebel bar, is also arranged crossing plural partial conductors.

Figure 2:
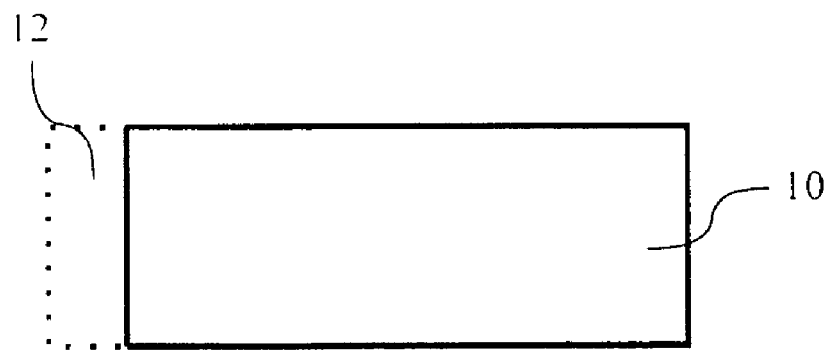

In FIG. 2, a cross section through a further electrical conductor 10 formed according to the principles of the present invention is also shown schematically. The recess shown here is embodied as a rectangular separation 12 and is reproduced in FIG. 2 by dashes. After removal of the separation 12, a signal conductor, for example an optical waveguide, can be arranged integrated in place of the separation and fixed using adhesive and filler. The filler also serves here to model the original external contour again. Since a separation usually takes place over the whole height of the conductor, such a separation is suitable however substantially only when the measurement value is to be determined in the edge region of the conductor.

Figure 3:
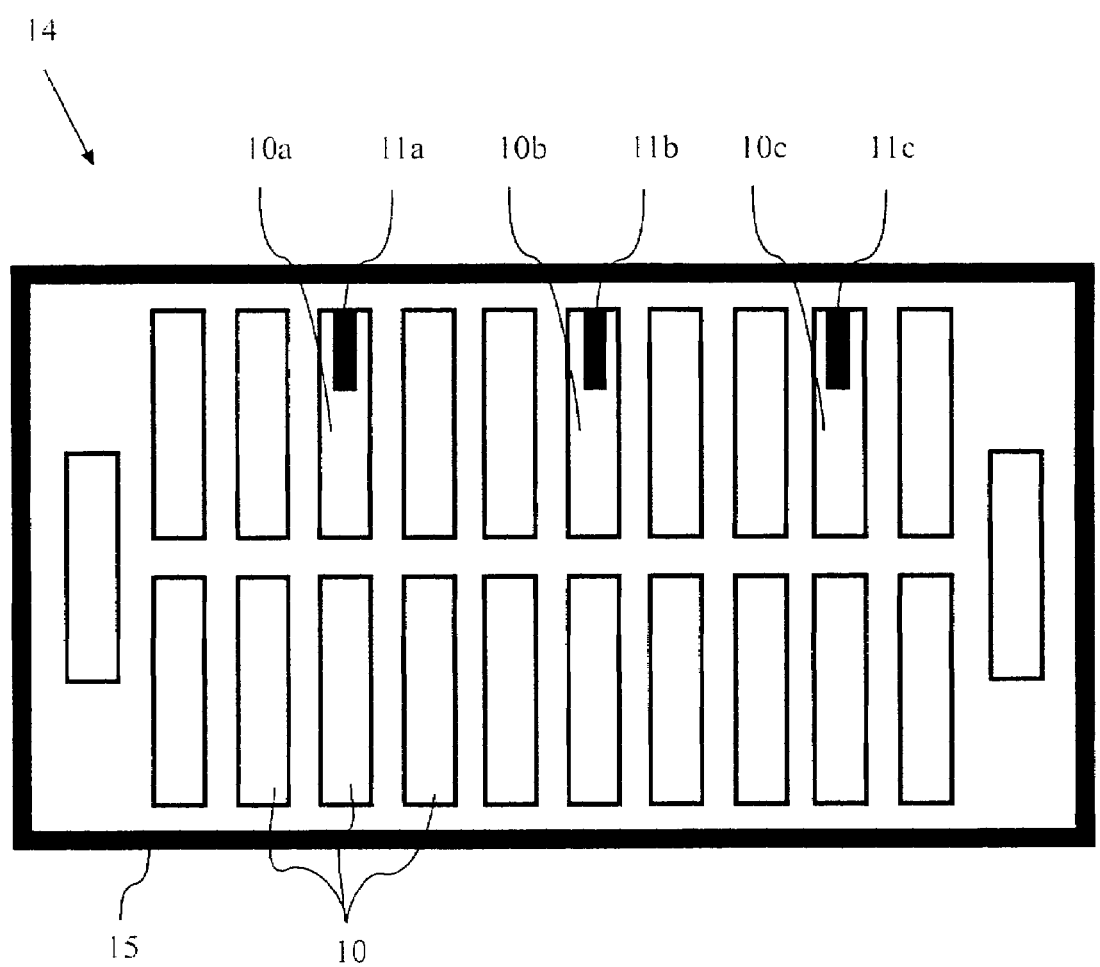
FIG. 3 shows a bar embodied according to the invention, comprising numerous partial conductors arranged mutually parallel.

FIG. 3 shows a bar 14 embodied according to the principles of the present invention and including numerous mutually parallel partial conductors 10. The partial conductors 10 are here arranged in two rows with respect to one another. Three partial conductors 10a, 10b, 10c located in the upper row have recesses 11a, 11b, 11c which are embodied as grooves and into which respectively a sensor, here a temperature sensor, and also an optical waveguide for conducting the sensor signal, are inserted. The remaining gap space is respectively filled with filler.

The bar 14 shown in FIG. 3 furthermore has an insulation 15 framing the bar, in order to prevent a voltage strikethrough from one bar to another bar arranged adjacently.

Such a bar can for example be built into a generator or a transformer.

Figure 4:
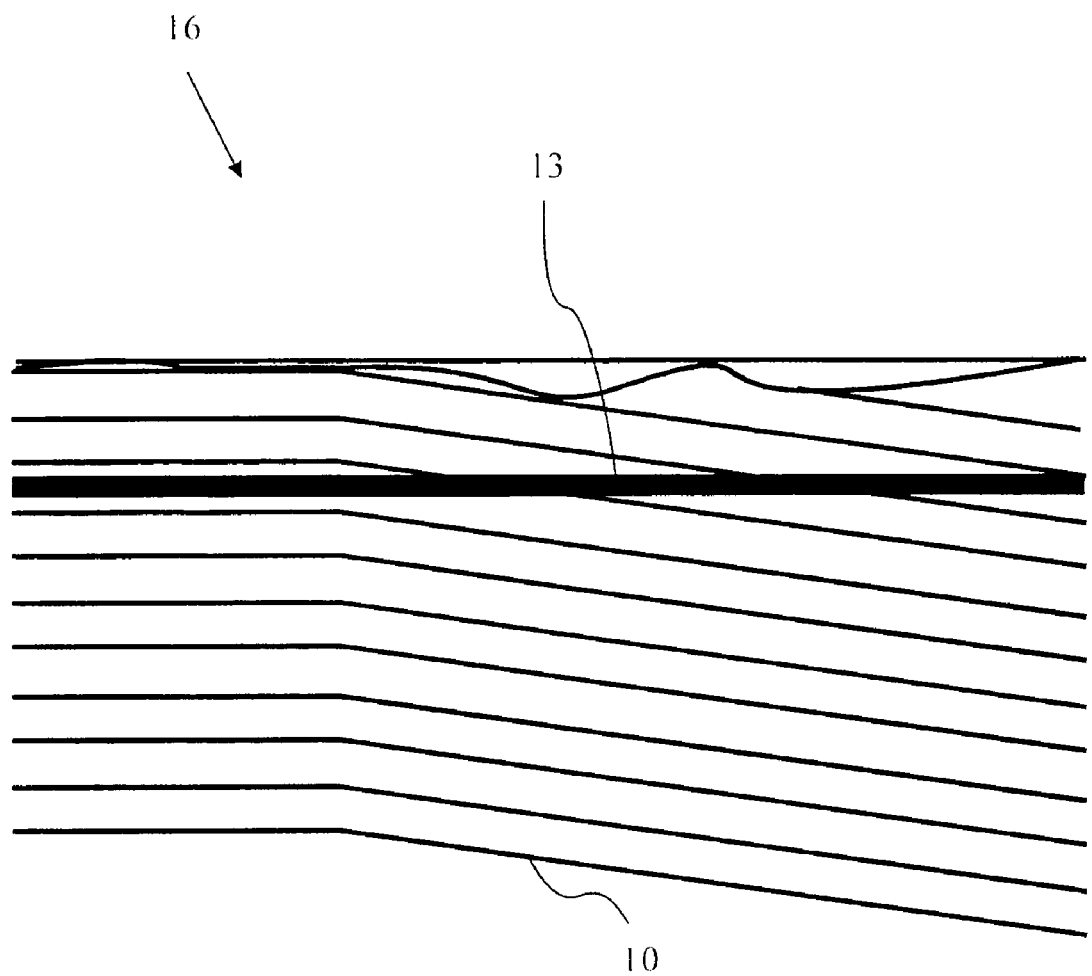
FIG. 4 shows a section through a Roebel bar embodied according to the invention.

FIG. 4 shows a section through a Roebel bar 16 according to the principles of the present invention. The Roebel bar 16 includes numerous partial conductors 10 which are transposed in the longitudinal direction, i.e., twisted with respect to one another. This Roebeling is to be seen on the one hand at the partial conductors running transversely at the upper edge of FIG. 4, and also at the folded course of the remaining partial conductors. A borehole 13 is made in this Roebel bar and an optical waveguide is installed in it as shown. The borehole 13 and also the optical waveguide hereby cross the partial conductors 10.

LIST OF REFERENCE NUMERALS 10 conductor or partial conductor
11 groove
12 separation
13 borehole
14 bar
15 insulation
16 Roebel bar While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

The invention claimed is:

1. An electrical conductor useful in an electrical machine, the conductor comprising:
   a conductor cross section and a length in a longitudinal direction;
   a recess in the conductor longitudinal direction at least along a section of the conductor, configured and arranged for integrated arrangement of a signal conductor; and
   a wound bar, and wherein the bar includes a plurality of partial conductors;
   wherein the recess runs transversely over said plurality of partial conductors.

2. An electrical conductor according to claim 1, wherein the recess comprises a slot-shaped groove.

3. An electrical conductor according to claim 1, wherein the recess comprises a separation of the electrical conductor.

4. An electrical conductor according to claim 1, comprising a bar.

5. An electrical conductor according to claim 1, wherein the recess runs along at least one of said plurality of partial conductors.

6. An electrical conductor according to claim 1, further comprising:
   a plurality of recesses arranged at different positions of the conductor.

7. An electrical conductor according to claim 1, configured and arranged for building into an electrical generator or transformer.

8. An electrical conductor according to claim 1, wherein the recess is configured and arranged for integrated arrangement of an optical waveguide.

9. An electrical conductor according to claim 1, wherein the wound bar comprises a Roebel bar.

10. An electrical conductor useful in an electrical machine, the conductor comprising:
    a conductor cross section and a length in a longitudinal direction;
    a recess in the conductor longitudinal direction at least along a section of the conductor, configured and arranged for integrated arrangement of a signal conductor; and
    a wound bar, and wherein the bar includes a plurality of partial conductors;
    wherein the recess comprises a conductor cable gap produced by removing at least one of said plurality of partial conductors from the bar.

11. An electrical conductor according to claim 10, wherein the recess comprises a slot-shaped groove.

12. An electrical conductor according to claim 10, wherein the recess comprises a separation of the electrical conductor.

13. An electrical conductor according to claim 10, comprising a bar.

14. An electrical conductor according to claim 10, wherein the recess runs along at least one of said plurality of partial conductors.

15. An electrical conductor according to claim 10, further comprising:
    a plurality of recesses arranged at different positions of the conductor.

16. An electrical conductor according to claim 10, configured and arranged for building into an electrical generator or transformer.

17. An electrical conductor according to claim 10, wherein the recess is configured and arranged for integrated arrangement of an optical waveguide.

18. An electrical conductor according to claim 10, wherein the wound bar comprises a Roebel bar.

19. A measuring unit comprising:
    an electrical conductor according to claim 1; and
    a signal conductor arranged in the recess of the electrical conductor.

20. A measuring unit according to claim 19, further comprising:
    at least one temperature sensor or at least one strain measuring sensor, configured and arranged such that signals generated by the at least one sensor are conducted into the signal conductor.

21. A measuring unit according to claim 19, wherein the signal conductor is configured and arranged to perform sensor functions, the sensor is a component of the signal conductor, or both.

22. A measuring unit according to claim 19, further comprising:
    an optical waveguide arranged such that it insulates conductive paths from one another, insulates the conductor bar, or both.

23. A measuring unit according to claim 19, further comprising:
    a tube; and
    wherein the optical waveguide is integrated in the tube.

24. A measuring unit according to claim 19, wherein the signal conductor comprises an optical waveguide.

25. A measuring unit comprising:
    an electrical conductor according to claim 10; and
    a signal conductor arranged in the recess of the electrical conductor.

26. A measuring unit according to claim 25, further comprising:
    at least one temperature sensor or at least one strain measuring sensor, configured and arranged such that signals generated by the at least one sensor are conducted into the signal conductor.

27. A measuring unit according to claim 25, wherein the signal conductor is configured and arranged to perform sensor functions, the sensor is a component of the signal conductor, or both.

28. A measuring unit according to claim 25, further comprising:
    an optical waveguide arranged such that it insulates conductive paths from one another, insulates the conductor bar, or both.

29. A measuring unit according to claim 28, further comprising:
    a tube; and
    wherein the optical waveguide is integrated in the tube.

30. A measuring unit according to claim 25, wherein the signal conductor comprises an optical waveguide.

* * * * *